(12) United States Patent
Wilkerson

(10) Patent No.: US 6,463,580 B1
(45) Date of Patent: *Oct. 8, 2002

(54) PARALLEL PROCESSING UTILIZING HIGHLY CORRELATED DATA VALUES

(75) Inventor: Christopher B. Wilkerson, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,012

(22) Filed: Nov. 18, 1998

(51) Int. Cl.[7] .................................................. G06F 9/46
(52) U.S. Cl. ...................... 717/149; 709/106; 712/241; 717/161
(58) Field of Search .......................... 712/241; 717/149, 717/161; 709/106

(56) References Cited

U.S. PATENT DOCUMENTS

| | | | |
|---|---|---|---|
| 5,088,034 A | * 2/1992 | Ihara et al. | 717/160 |
| 5,437,034 A | * 7/1995 | Tanaka et al. | 717/160 |
| 5,535,393 A | * 7/1996 | Reeve et al. | 717/149 |
| 5,586,320 A | * 12/1996 | Hotta et al. | 709/106 |
| 5,781,752 A | * 7/1998 | Moshovos et al. | 712/216 |
| 5,802,602 A | * 9/1998 | Rahman et al. | 711/204 |
| 5,822,788 A | * 10/1998 | Kahn et al. | 711/213 |
| 6,163,839 A | * 12/2000 | Janik et al. | 712/219 |
| 6,182,210 B1 | * 6/2001 | Akkary et al. | 712/235 |

OTHER PUBLICATIONS

Joseph, D., et al., "Prefetching Using Markov Predictors", *Proceedings of the International Symposium on Computer Architecture*, Jun. 1997, Denver Colorado (1997).

Lipasti, M.H., et al., "Exceeding the Dataflow Limit via Value Prediction", *Proceedings of the 29th Annual ACM/IEEE International Symposium on Microarchitecture*, Dec. 2–4, 1996, Paris, France (1996).

* cited by examiner

*Primary Examiner*—Kenneth S. Kim
(74) *Attorney, Agent, or Firm*—Schwegman, Lundberg, Woessner & Kluth, P.A.

(57) ABSTRACT

A speculative execution method decreases execution time. A key value and a correlated value are stored as a correlated data values pair. Upon matching a current value to the key value, the correlated value is retrieved. A first thread is executed using the current value to produce a first result. The first result is consumed by a second thread. The second thread is speculatively executed using the correlated value to produce a second result. Upon verifying that the first result is the same as the correlated value, the second result is used. The first and second threads are iterations of a loop. The first and second threads use indirect addressing. The first and second threads use a linked list data structure. Storing the key value and the correlated value as the correlated data values pair comprises storing the correlated data values pair in a lookup table.

5 Claims, 3 Drawing Sheets

```
LOOP:
    IF(PTR==0)
    GOTO END_LOOP
    NUM=*(PTR)
    IF(NUM==NUMBER)
    GOTO END_LOOP
    PTR=*(PTR+4)
    IF(PTR==0)
    GOTO END_LOOP
    NUM=*(PTR)
    IF(NUM==NUMBER)
    GOTO END_LOOP
    PTR=*(PTR+4)
    BRA LOOP
```

| NODE 1,2 PROCESSED<br>LOOP:<br><br>    PRED_KEY SPTR, PTR<br>    IF(PTR==0)<br>    GOTO END_LOOP<br>    NUM=*(PTR)<br>    IF(NUM==NUMBER)<br>    GOTO END_LOOP<br>    PTR=*(PTR+4)<br><br>    IF(PTR==0)<br>    GOTO END_LOOP<br>    NUM=*(PTR)<br>    IF(NUM==NUMBER)<br>    GOTO END_LOOP<br>    PTR=*(PTR+4)<br>    PRED_VAL PTR<br>    IF(SPTR!=PTR)<br>    GOTO LOOP | NODE 3,4 PROCESSED<br><br>    IF(SPTR==0)<br>    GOTO FIXUP1<br>    SNUM=*(SPTR)<br>    IF(SNUM==NUMBER)<br>    GOT FIXUP2<br>    NSPTR=*(SPTR+4)<br><br>    IF(NSPTR==0)<br>    GOTO FIXUP3<br>    SNUM=*(NSPTR)<br>    IF(SNUM==NUMBER)<br>    GOTO FIXUP4<br>    NSPTR=*(NSPTR+4) |
|---|---|
| SYNCHRONIZE ||
| PTR=NSPTR ||
| GOTO LOOP ||

US 6,463,580 B1

PARALLEL PROCESSING UTILIZING HIGHLY CORRELATED DATA VALUES

FIELD

This invention relates generally to parallel processing, and more particularly to parallel processing utilizing correlated data values.

BACKGROUND

Generally, there has been a need for greater speed at which computer programs are executed on computers. A computer typically has at least one processor, which is the part of a computer that usually runs the instructions that make up a computer program. In what is known as sequential or serial processing, the instructions that make up a computer program are executed one at a time by a processor of a computer. That is, a first instruction is executed, then a second instruction is executed, until the program is finished. Therefore, in sequential or serial processing, a manner by which execution speed of programs can be increased is to increase the speed at which the processor of the computer executes instructions.

In another type of processing, known as parallel processing, increased execution speed of computer programs is achieved by executing instructions of a computer program in parallel with one another. Thus, for example, a first instruction may be executed by a first processor of the computer at the same time as a second instruction is executed by a second processor (or, a different part of the first processor), then a third instruction may be executed by the first processor at the same time as a fourth instruction is executed by the second processor (or, the different part of the first processor), etc.

Parallel processing is, however, generally not as commonplace as sequential processing. Computer programmers, for example, are typically not as experienced in developing computer programs that take advantage of parallel processing as they are in writing programs that are to be sequentially processed. Thus, there has been generally more emphasis placed on increasing the instruction execution speed of processors themselves to achieve increased execution speed of computer programs, rather than on utilizing parallel processing to achieve increased executed speed of computer programs.

SUMMARY

The present invention relates to parallel processing utilizing correlated data values. One embodiment of the invention includes a method. The method renders active a correlated data values pair comprising a key value and a value correlated with the key value. The method next performs a task utilizing the value correlated with the key value in parallel with the task utilizing the key value. The method then renders inactive the correlated data values pair. Other embodiments of the invention include methods, systems and processors of varying scope.

BRIEF DESCRIPTION OF THE DRAWINGS

FIG. 3(a) shows a table a linked list search written in assembly without the use of CDV pairs;

FIG. 3(b) shows a table of a linked list search written in assembly utilizing CDV pairs, according to an embodiment of the invention; and, FIG. 4 shows a diagram of a computer, in conjunction with which embodiments of the invention may be practiced.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
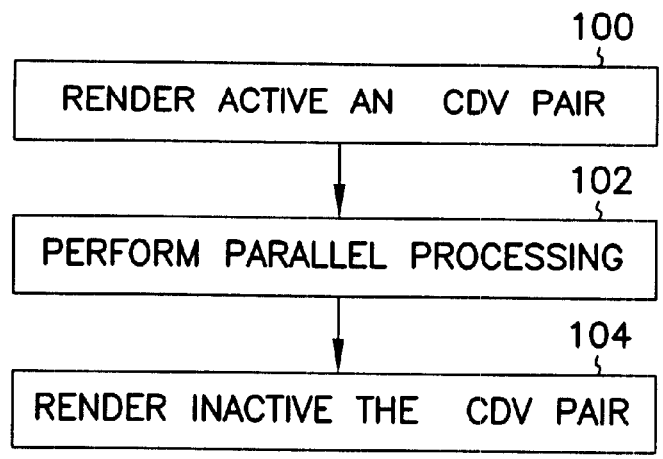
FIG. 1 shows a flowchart of a method according to an embodiment of the invention.

Referring first to FIG. 1, a method according to an embodiment of the invention is shown. In 100, a correlated data values (CDV) pair is rendered active. The pair is rendered active so that parallel processing may be performed with respect to the correlated data values within the CDV pair.

The CDV pair includes a key value and a value correlated with the key value. Thus, a CDV pair is defined as any data value that can be correlated with a key value. The goal of the CDV pair is to improve performance. Correlated data values can occur in one situation when a sequence of instructions f(X) has an input X that is correlated with an input Y. An CDV pair thus includes a single input and a single output, where the input is the key value, and the output is the value correlated with the key value. As an example for illustrative purposes only, and not meant to limit any embodiment of the invention, the input X and the output Y of a mathematical function f(X)=Y are an CDV pair with a correlation of one. Embodiments of the invention relate to correlated data values, such that the correlation may not be one. The definition of a correlation may vary; in one embodiment, the correlation can be greater than 0.5, while in another embodiment, the correlation can be greater than 0.9.

For example, one situation where correlated data values occur is in a linked list. The first entry in a linked list may usually point to the second entry, based on some prior history, such that the second entry is correlated with the first entry (the first entry being the key value). Therefore, processing may be performed on the first and the second entries in parallel. However, the first entry may not always point to the second entry, such that processing of the second entry is said to be speculative. Processing of the second entry is not certain until it is known that in the current case the first entry does in fact point to the second entry. Note that this type of parallel processing is distinct from sequential processing, where processing of the second entry is not performed until after processing of the first entry has occurred.

In one particular embodiment, 100 includes receiving the value correlated with the key value. Thus, an instruction may be executed having two arguments, where one argument includes the key value, and the other argument references an output register in which the value correlated with the key value is inserted. This instruction can in one particular embodiment be accomplished by looking up the key value in a table to obtain the value correlated with the key value. However, if an CDV pair corresponding to the key value does not exist in the table, a storage location in the table can in one particular embodiment be allocated for this new CDV pair having the current key value.

In 102, parallel processing is performed. That is, a task is performed, in one iteration or thread utilizing the key value, and in another iteration or thread utilizing the value correlated with the key value. Thus, 102 performs parallel processing by taking advantage of the correlation between the key value and the value correlated with the key value, as this pair was rendered active in 100.

Finally, in 104, the correlated data values pair is rendered inactive. 104 is thus complementary to 100. In one particular embodiment, 104 includes setting the value correlated with the key value. Thus, an instruction may be executed having one argument, where the argument is the value correlated with the key value previously passed as an argument when the pair was rendered active in 100. This instruction thus in one particular embodiment can act to update a table in which CDV pairs are stored, such that the instruction passes the value correlated with and corresponding to the key value of the current, heretofore active CDV pair.

As has been described, a method according to one embodiment achieves parallel processing by rendering a correlated data values pair active, performing parallel processing instructions in relation to the two values of the CDV pair, and then rendering the pair inactive. Rendering the pair active in one particular embodiment obtains the correlated data value as can be looked up in a table corresponding to a given key value. Rendering the pair inactive in one particular embodiment stores the correlated data value corresponding to key value of the active pair.

Thus, by rendering the CDV pair inactive, in one particular embodiment, the CDV pairs stored in a table are continuously updated. In this manner, the correlation of the key values with their corresponding correlated data values can be maintained as close to one as possible, providing for more accurate parallel processing.

Figure 2:
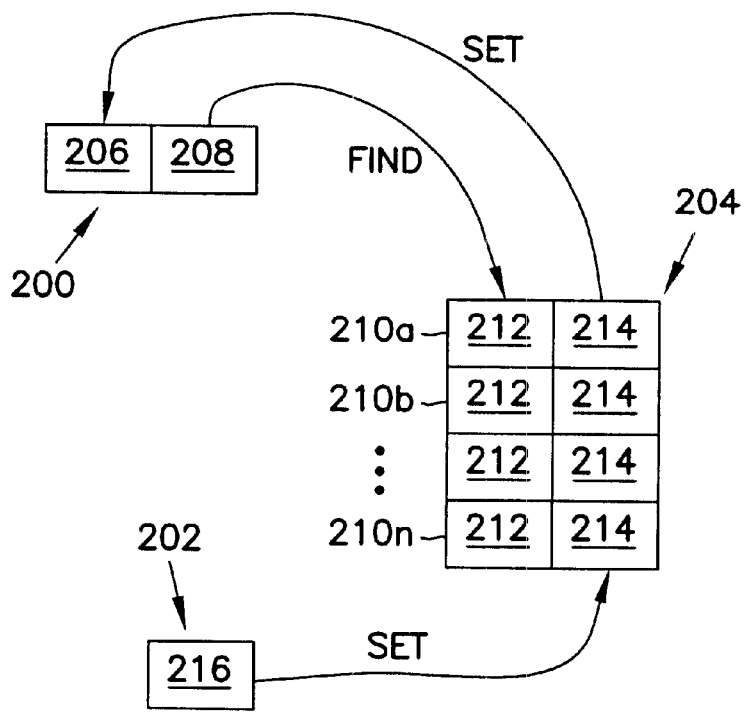
FIG. 2 shows a diagram of a system according to an embodiment of the invention.

Referring next to FIG. 2, a diagram of a system according to an embodiment of the invention is shown. The system can in one particular embodiment be implemented as part of a processor of a computer, although the invention itself is not so limited. That is, the instructions as described herein may be implemented as part of modules of a processor, etc., where the term module refers to any hardware aspect of the processor. Furthermore, the table as described herein may be implemented as stored in memory of the processor. The invention is not particularly limited. The system includes a first instruction 200, a second instruction 202, and a table 204. The instructions 200 and 202 are instructions native to the system (for example, a processor), such that computer programs may include these instructions as a part thereof.

The table 204 includes entries 210a, 210b, . . . , 210n, where each entry includes a key value 212 and a value 214 correlated with the key value. New entries can be created in the table 204 for key values that are not already within an existing entry of table 204. Furthermore, the value 214 for an already existing entry within table 204 can also be changed. The value 214 for an existing entry within table 204 having a given key value 212 can also be looked up in the table 204.

The invention is not particularly limited to a given implementation of the table 204. In one embodiment, the table 204 is implemented as a direct mapped structure, as known in the art. In another embodiment, the table 204 is implemented as a two-way set associative structure, as also known within the art. The table 204 can also in another embodiment be stored within a cache that may already exist within the system (for example, where the system is a processor). In such an embodiment, the cache desirably should include an extra bit to differentiate between lines containing speculative data (that is, the CDV pairs), and lines containing normal addressable data.

The first instruction 200 is to receive a value correlated with a key value. The first instruction 200 includes a first argument 206 and a second argument 208. The first argument 206 is to hold the value correlated with the key value, and the second argument 208 is to hold the key value itself. Execution of the first instruction 200 renders the key value stored in the argument 208 and the value correlated with the key value stored in the argument 206 as a correlated data values (CDV) pair that is active.

Thus, execution of the first instruction 200 within a computer program operates as follows. The key value 212 of each entry 210a, 210b, . . . , 210n of the table 204 is examined to determine if there is a match with the parameter 208 of the first instruction 200. If there is a match, then the value 214 of this entry is returned in the parameter 206 (for example, a register referenced in the parameter 206). If there is not a match, then a new entry within the table 204 is created, having a key value 212 set to that of the key value within parameter 208 of the instruction 200.

The second instruction 202 is to set the value correlated with the key value. Because the second instruction 202 desirably should be executed only after the first instruction 200 has already been executed, the value set by the second instruction 202 is the value correlated with the key value that was referenced in the parameter 208 of the instruction 200. The second instruction 202 includes an argument 216 to hold the value correlated with the key value. Execution of the second instruction 202 renders the CDV pair that had been previously made active by the first instruction 200 inactive.

Execution of the second instruction 202 works as follows. The value 214 of the entry within table 204 that was previously matched by execution of the first instruction 200 or created by execution of the first instruction 200 is set to the parameter 216 of the second instruction 202. In this manner, execution of the second instruction 202 updates the value 214 of the previously matched or created entry within table 204 that is correlated with the key value 212 of this entry. That is, the parameter 216 is the new value correlated with the key value of this entry.

It is noted that the instructions 200 and 202 work as a pair in one embodiment. That is, the instruction 200 activates a CDV pair, the pair being then deactivated with the instruction 202. Note that the invention is not necessarily so limited, however. For example, in another embodiment of the invention, deactivation via an instruction such as instruction 202 may not be necessary following the activation via an instruction such as the instruction 200.

An example of the use of one embodiment of the invention is shown by reference to FIG. 3(a) and FIG. 3(b). The example is presented for illustrative purposes only, and is not meant to limit any embodiment of the invention. Referring first to FIG. 3(a), a table is shown of a linked list search, as known within the art, written in assembly without the use of CDV pairs. As those of ordinary skill within the art can appreciate, the critical path in the loop is determined by the instruction ptr=*(ptr+4) which dereferences the next pointer and retrieves the address of the next element in a linked list. Since each node includes a pointer to the next node, the system (for example, a processor) is limited by the rate at which it can obtain pointers.

Referring next to FIG. 3(b), a table is shown of a linked list search written in assembly utilizing CDV pairs, according to an embodiment of the invention. The table of FIG. 3(b) shows the same loop as in FIG. 3(a), except that it is represented as two separate threads, identified by column 300 and column 302, utilizing an embodiment of the invention. The non-speculative thread is identified by column 300, and column 302 identifies the speculative thread. The pred⎺key instruction in column 300 corresponds to the first instruction of an embodiment of the invention as has been described. The pred⎺val instruction in column 300 corresponds to the second instruction of an embodiment of the invention as has been described. While the non-speculative code of column 300 processes nodes n, n+1 in the linked list, the speculative instructions in column 302 processes nodes n+2, n+3 using the speculative link. The synchronize instruction of FIG. 3(b) represents the point at which the two threads must synchronize.

It has been observed that speculation as in the example of FIG. 3(b) adds about 24% overhead to the execution time of the loop; however, the throughput of the loop has doubled, resulting in a speed increase of about 50% on linked-list traversals with CDV history. As those of ordinary skill within the art can appreciate, the first traversals of the list will be significantly slower due to the lack of CDV history. That is, traversals of the list are slower until a table of CDV pairs has been built up, such that values correlated with the key values have been set.

Figure 4:
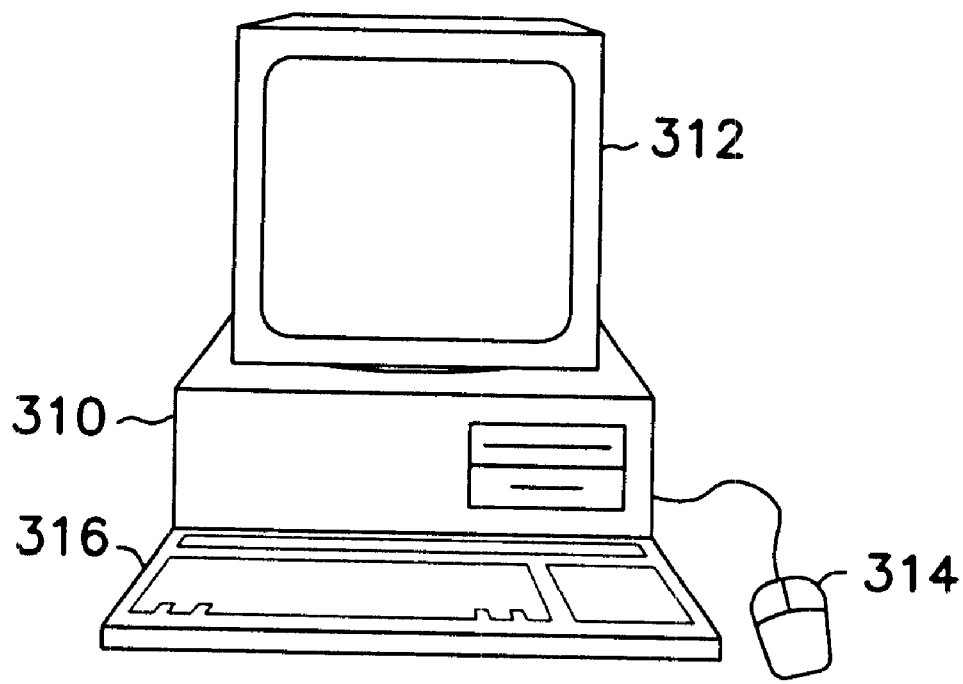

Referring finally to FIG. 4, a diagram of a computer in conjunction with which embodiments of the invention may be practiced is shown. Computer 310 is operatively coupled to monitor 312, pointing device 314, and keyboard 316. Computer 310 includes a processor that can be in accordance with an embodiment of the invention, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interface of operating systems. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Parallel processing utilizing correlated data values has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A method of speculative execution, comprising:

storing a key value and a correlated value as a correlated data values pair;

upon matching a current value to the key value, retrieving the correlated value;

executing a first thread using the current value to produce a first result, wherein the first result is consumed by a second thread;

speculatively executing the second thread using the correlated value to produce a second result; and upon verifying that the first result is the same as the correlated value, using the second result;

wherein using the second result decreases execution time.

2. The method as recited in claim 1, wherein the first and second threads are iterations of a loop.

3. The method as recited in claim 1, wherein the first and second threads use indirect addressing.

4. The method as recited in claim 3, wherein the first and second threads use a linked list data structure.

5. The method as recited in claim 1, wherein storing the key value and the correlated value as the correlated data values pair comprises storing the correlated data values pair in a lookup table.

* * * * *